Dec. 29, 1970          A. BIELUSICI          3,551,036
METHOD AND APPARATUS FOR STEREOSCOPIC PHOTOGRAPHY
Filed Oct. 17, 1966                                 2 Sheets-Sheet 1

United States Patent Office 3,551,036
Patented Dec. 29, 1970

3,551,036
METHOD AND APPARATUS FOR
STEREOSCOPIC PHOTOGRAPHY
Anton Bielusici, Bucharest, Rumania, assignor to
Comitetul de Stat pentru Cultura si Arta, Bucharest,
Rumania
Filed Oct. 17, 1966, Ser. No. 587,102
Claims priority, application Rumania, Oct. 25, 1965,
50,452
Int. Cl. G03b 35/08, 35/18
U.S. Cl. 352—60                                3 Claims

ABSTRACT OF THE DISCLOSURE

Two 35 mm. stereoscopic images are photographed in side-by-side relationship on a single 35 mm. motion picture film frame by laterally compressing both images through a single anamorphotic lens to approximately half of their normal width and projecting the compressed images in side-by-side relationship onto a single 35 mm. film frame. The images are expanded back to their normal width when the film is projected onto a screen for viewing.

---

The object of the present invention is to photograph both halves of a stereoscopic couple on a single 35 mm. film strip for 3D projection.

There are a number of well known processes for stereoscopic photography and projection. The binocular method is the simplest and most widely used method to produce stereoscopic effects both in photography and in cinematography. There are several variations of the method which will be explained below. These variations try to realize the selection of pictures first on their photographic recordings and then on their reproduction.

In cinematography, the main variations are divided in two groups which ensure the selection of two stereoscopic images, as follows:

(1) Systems in which the spectators have to be provided with:

(a) anaglyphes (bicolored glasses), or
(b) spectacles with polarization filters, or
(c) alternating projection by means of synchronous rotating shutters or the like.

(2) Free eye systems in which the stereoscopic effect is produced by the projection screen itself. This group includes the following systems:

(a) screen with parallel lattice,
(b) screen with radial lattice (Noillon, Savoye), and
(c) screen with radial lattice and filiform lens (Ivanov).

To photograph the primary couple of the stereoscopic images on the film there are two methods within the stereoscopic film process depending on whichever of the above described systems is used.

(A) Single strip system: This system has three basic possibilities, as follows:

(1) The first possibility is to divide the normal film frame in a longitudinal or transversal format.
(2) The second possibility is to locate the frames of the stereoscopic couple in their normal size one above the other on the film strip.
(3) The third possibility is to overlap two frames of the stereoscopic couple so that these frames are optically differentiated, the spectator getting the corresponding images by a selecting process, e.g., by anaglyphes.

(B) Double strip system: Two separate films are used, each comprising a single image of the stereoscopic couple; e.g., on one 35 mm. film strip the left half-images of the stereoscopic couple are recorded and on the second 35 mm. film strip, the right half-images of the stereoscopic couple are recorded. Thus, there are two distinct negatives, one with left half-images, and the other one with right half-images.

To produce the half-negatives in the filming process, a single camera with two films which are mechanically synchronized is used or two identical cameras coupled together at a parallactic distance are used with their films being synchronized by mechanical or "electric shaft" means.

The prior art systems which are described above have the following disadvantages:

(a) A small quantity of information (in the single strip system),
(b) Alterations required in the filming and projection apparatus,
(c) Sophisticated apparatus required and difficulties in resynchronizing (the double strip system only) when the film breaks down,
(d) Double film consumption, and
(e) Eye strain.

In accordance with this invention, the above-noted disadvantages are overcome by a novel method and means for photographing on a 35 mm. single film strip the stereoscopic couple required by stereocinematographic projection using the binocular method, the two images of the stereoscopic couple being disposed in the form of two adjacent and juxtaposed frames compressed by the anamorphotic method, every frame with the same quantity of information, corresponding each to a normal frame for the left half-image and for the right half-image, respectively; the filming and the projecting being accomplished with only one device for each operation.

In the projection process there is a reverse operation. By the same anamorphotic method, the two half-images of the stereoscopic couple are expanded and the selection in the stereoscopic image is accomplished by the known methods from the items (1) and (2) above.

The objects and advantages of the invention will be better understood from the following description of several specific embodiments thereof, as illustrated in the attached drawings, in which.

Figure 1:
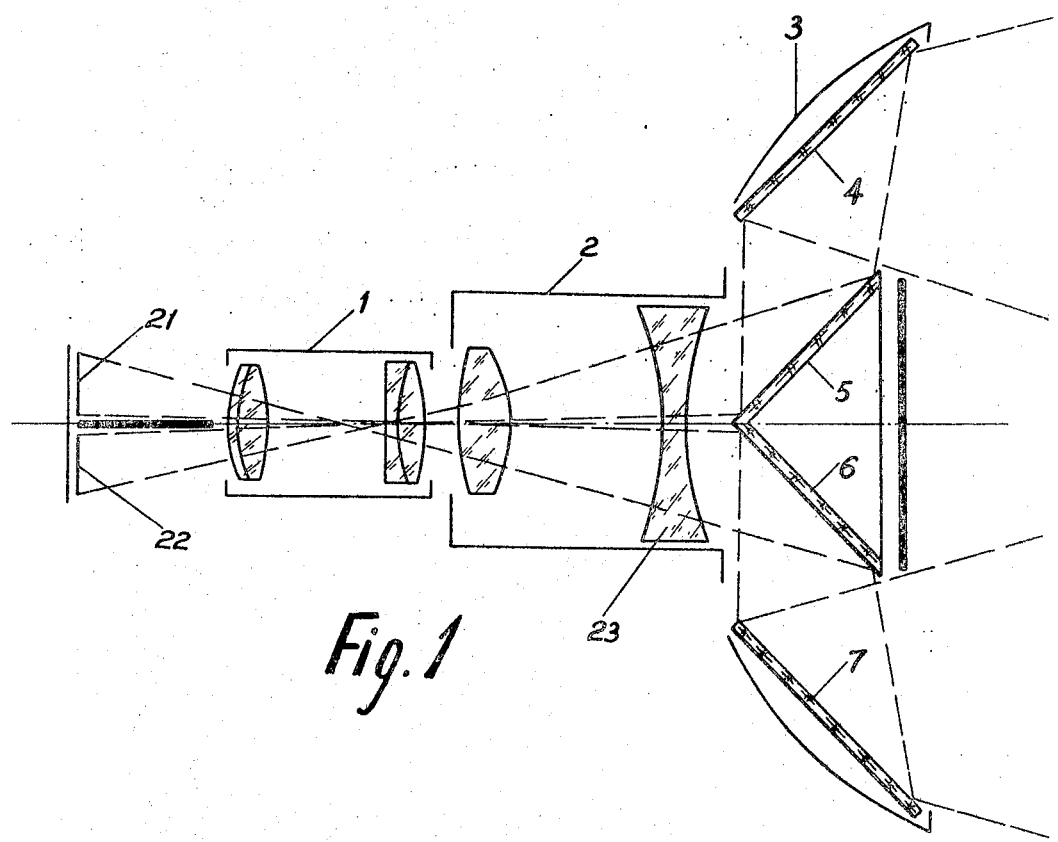
FIG. 1 is a vertical cross-sectional view of the optical system for a first stereoscopic camera of this invention.
Figure 2:
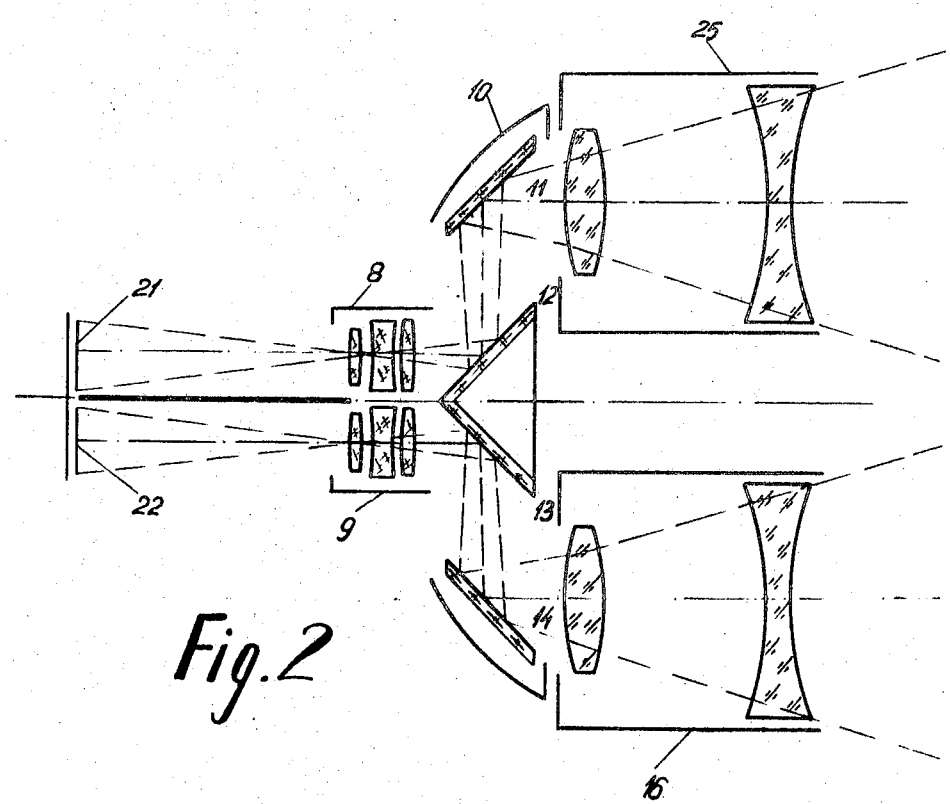
FIG. 2 is a vertical cross-sectional view of the optical system for a second stereoscopic camera of this invention.

The optical devices according to the invention are the following:

(1) To photographically record the stereoscopic images, a compound optical system with a single anamorphotic (compression) objective (FIG. 1) or a compound optical system with two anamorphotic objectives (FIG. 2) can be used.

(2) To project the stereoscopic images, a compound optical system formed by a spherical lens of the projection machine and an anamorphotic lens for projection as well as a biprism which superposes on the screen the two expanded images can be used.

The single anamorphotic lens optical system: This system, to photographically record the stereoscopic couple by anamorphosing its half-images (FIG. 1), comprises the basic lens 1 of the camera, an anamorphotic lens 2 for filming as well as mirrors 4, 5, 6, 7, which form an optical reflection complex 3 that is called the "stereoscopical annex" to create the parallax required by the stereoscopic recording. This system may be used with a basic lens having a focal distance from 50 mm. up.

The double anamorphotic lens optical system: This system, to photographically record the stereoscopic couple by anamorphosing its half-images (FIG. 2), involves two spherical lenses 8 and 9 spaced at a distance corresponding to the axis gap of the two photographs of the stereoscopic couple. The spherical lenses are connected with the stereoscopic annex 10 which produces the parallactic distance which is desired for the stereoscopic record. Two anamorphotic lenses 15 and 16 are mounted parallel to the optical axis of the basic lens. The axes of lenses 15 and 16 are separated by a distance equal to the value of the parallax. These lenses utilize a spherical lens to compress the couple of the two half-images on the two half-frames of the 35 mm. motion picture film.

The stereoscopic annex 10 utilizes four mirrors 11, 12, 13 and 14 positioned to create the parallactic distance required by the stereoscopic recording. This system may be used with a basic lens having a focal distance between 28 mm. and 50 mm.

Figure 3:
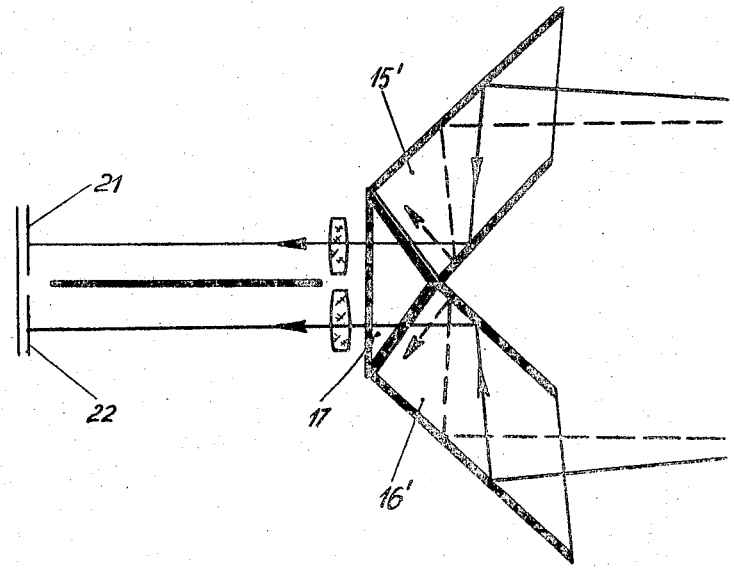
FIG. 3 is a vertical cross-sectional view of the optical system for a third stereoscopic camera of this invention.

There is another way to construct the stereoscopic annexes 3 and 10. This is with a prism combination as shown in FIG. 3. In this case, the stereoscopic annex with prisms is mounted ahead of the two basic lenses. This annex involves two rhomboidal prisms 15' and 16' which deflect the light beams which pass through the annex as the figure shows. To avoid color errors, the two optical glass prisms—both with the same refraction index—are bound together with a third prism 17 with a quite different refraction index than that of the two prisms 15' and 16'. Two air gaps to completely refract the light beams with chromatic dispersal (dotted) are provided. These light beams are broken when they reach the air gap, thus being eliminated from the system while the light beams which form the proper structure of the image are directed through the basic lens.

According to the present invention, the projection of the stereoscopic image is based also on the anamorphose principle. The compressed frame halves are projected by optical means, similar to those used to photograph the stereoscopic image.

Figure 4:
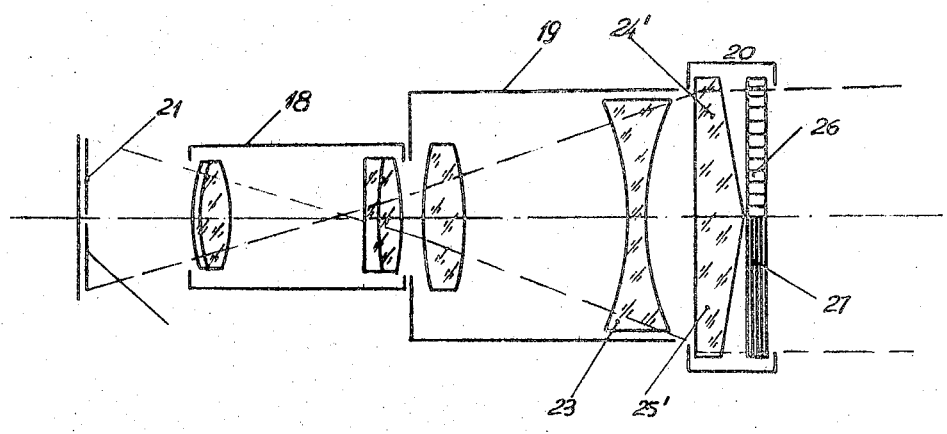
FIG. 4 is a vertical cross-sectional view of the optical system for a stereoscopic projector of this invention.

FIG. 4 shows the arrangement of the optical system for a stereoscopic projector using a single strip according to the preceding method. The component parts of this system are as follows: spherical projection lens 18, an anamorphic projection lens 19 for disanamorphosing and an additional device 20 provided with two wedge shaped prisms 24' and 25'. The light beams travel their normal way from the stereoscopic image couple 21 and 22 to the exit surface of the cylindric front lens 23 by way of the anamorphotic lens 19.

The insertion of the wedge shaped prisms 24' and 25' deflects the projection beam path and causes the half-images to be overlapped on the screen.

The frontal device 20 comprises also polarization filters 26 and 27 vertically placed in V position, so that when viewed through polarization spectacles, with filters properly oriented, the disanamorphosed and superposed images of the stereoscopic couple are separately perceived, i.e., each eye sees the image which corresponds to it.

If the projection occurs without devices placed in front of the eyes, e.g., radial latticed screen, the optical projection system does not change; it is the same without requiring polarization filters.

The optical stereoscopic projection system is not limited, however, to the structure shown; instead of prisms 24 and 25 it is possible to use a stereoscopic annex like those described above except that the outside mirrors 11 and 14 (see FIG. 2) are adjustable, so that the two images of the stereoscopic couple may be superposed.

Since the whole surface of the 35 mm. film image is used, two magnetic tracks are provided on the borders of the film outside the perforations to reproduce the sound according to the French proposal at the Second International Dispatch of Cinematographic Technique (UNIATEC) 1956. (Jean Vive. Les techniques Nouvelles dans le Cadre de la Normalisation. II-o COOLOQUIO INTERNAZIONALE DI TECNICA CINEMATOGRAFICA, Roma 1956.)

Under these conditions it is possible that a standard copy of the film may contain a two channel stereophonic recording. The film copies, however, could be sonorized in two variants or else they could constitute a spare magnetic track still nonsonorized for later wound recordings or synchronizing.

Due to the fact that the compressing factor of the anamorphotic lens in stereoscopic filming by the proposed method is equal 2, it is identical with that of the current anamorphotic lens used in present projection theaters. The optical devices for projection are therefore much simplified in that stereoscopic projection by the proposed method can use spherical and anamorphotic lenses which are available in every up-to-date cinema.

It will be understood that the above description of the present invention is susceptible to various modifications, changes and adaptations, and the same are intended to be comprehended within the meaning and range of equivalents of the appended claims.

I claim:

1. Apparatus for photographing onto each single film frame of a standard height-width ratio motion picture film strip both halves of a stereoscopic couple, comprising, in combination:
   (a) a stereoscopic optical annex assembly for receiving two image carrying beams which are spaced apart by a predetermined parallax angle and for directing said two beams in side-by-side relationship;
   (b) a single anamorphotic objective lens in the intended path of both of such image carrying beams for laterally compressing both image carrying beams to approximately half their normal width; and
   (c) a single lens with a focal distance greater than 50 mm. in the path of both of such laterally compressed image carrying beams for forming the images in side-by-side relationship on a single 35 mm. film frame.

2. Apparatus as defined in claim 1 wherein said stereoscopic annex assembly comprises two rhomboid prisms and a triangular prism for compensating for chromatic distortion in said rhomboid prisms.

3. A method of photographing both halves of a 35 mm. stereoscopic couple of each single 35 mm. motion picture film frame, comprising the steps of:
   (a) receiving two horizontally spaced stereoscopically related image carrying beams from the subject being photographed;
   (b) laterally compressing the two image carrying beams of the stereoscopic couple to approximately half of their normal width with a single anamorphotic lens;
   (c) thereafter focusing the compressed images in side-by-side relationship onto a single 35 mm. frame with a single objective lens; and
   (d) forming permanent picture frames carrying said compressed side-by-side images.

References Cited

UNITED STATES PATENTS

| | | | |
|---|---|---|---|
| 1,341,338 | 5/1920 | Parker | 352—67OX |
| 1,714,849 | 5/1929 | Daponte | 352—62OX |
| 2,554,532 | 5/1951 | Juillet | 352—42UX |
| 2,736,250 | 2/1956 | Papritz | 352—60OX |

FOREIGN PATENTS

| | | | |
|---|---|---|---|
| 1,249,581 | 11/1960 | France | 352—85 |
| 1,286,874 | 1/1962 | France | 352—239 |

JOHN M. HORAN, Primary Examiner

M. H. HAYES, Assistant Examiner

U.S. Cl. X.R.

352—65